United States Patent [19]
Dietz et al.

[11] Patent Number: 5,369,882
[45] Date of Patent: Dec. 6, 1994

[54] TURBINE BLADE DAMPER

[75] Inventors: Philip W. Dietz, Cincinnati; Charles E. Steckle, Loveland; Robert J. Corsmeier, Cincinnati, all of Ohio

[73] Assignee: General Electric Company, Cincinnati, Ohio

[21] Appl. No.: 144,368

[22] Filed: Nov. 2, 1993

Related U.S. Application Data

[62] Division of Ser. No. 830,143, Feb. 3, 1992, Pat. No. 5,302,085.

[51] Int. Cl.$^5$ .............................................. B23P 15/00
[52] U.S. Cl. ................................. 29/889.1; 29/889.21; 29/889.23; 416/193 A
[58] Field of Search ............... 416/220 R, 248, 500, 416/193 A; 29/889.1, 889, 889.21, 428, 557

[56] References Cited

U.S. PATENT DOCUMENTS

| | | | |
|---|---|---|---|
| 1,554,614 | 9/1922 | Allen . | |
| 2,356,605 | 1/1941 | Meininghaus | 253/39 |
| 2,912,223 | 11/1959 | Hull, Jr. | 253/77 |
| 3,037,741 | 6/1962 | Tuft | 253/77 |
| 3,181,835 | 5/1965 | Davis | 253/77 |
| 4,182,598 | 1/1980 | Nelson | 416/193 |
| 4,347,040 | 8/1982 | Jones et al. | 416/190 |
| 4,355,957 | 10/1982 | Sifford et al. | 416/145 |
| 4,494,909 | 1/1985 | Forestier | 416/190 |
| 4,497,611 | 2/1985 | Keller | 415/191 |
| 4,505,642 | 3/1985 | Hill | 416/193 |
| 4,516,910 | 5/1985 | Bouiller | 416/190 |
| 4,568,247 | 2/1986 | Jones et al. | 416/190 |
| 4,856,963 | 8/1989 | Brown et al. | 416/145 |
| 4,872,810 | 10/1989 | Brown et al. | 416/145 |
| 4,872,812 | 10/1989 | Hendley et al. | 416/190 |
| 4,917,574 | 4/1990 | Dodd et al. | 416/193 |
| 4,936,749 | 6/1990 | Arrao et al. | 416/193 |
| 5,285,572 | 2/1994 | Rathi et al. | 29/889.1 |

Primary Examiner—Irene Cuda
Attorney, Agent, or Firm—Jerome C. Squillaro; Bernard E. Shay

[57] ABSTRACT

A generally wedge-shaped vibration damper for rotor blades of a gas turbine engine has a pair of scrubbing surfaces and is loosely retained in a pocket incorporated in the rotor blade platform. The pocket is partly defined by a plurality of surfaces which orient the damper so that it is slidably displaceable and rotatable only in a predetermined plane. During rotation of the rotor disk, the damper of one rotor blade is displaced in a plane transverse to the rotor axis of rotation by centrifugal forces to a position at which one scrubbing surface of the damper abuts a side surface of the platform of the adjacent rotor blade and the other scrubbing surface abuts an inner surface of the platform of the rotor blade in which the damper is inserted. The scrubbing action of the damper serves to damp vibratory motion in the platforms of both blades.

6 Claims, 4 Drawing Sheets

TURBINE BLADE DAMPER

This application is a division of application Ser. No. 07/830,143, filed Feb. 3, 1992, now U.S. Pat. No. 5,302,085.

FIELD OF THE INVENTION

This invention relates generally to rotors of turbines and compressors in a gas turbine engine. Specifically, the invention relates to an improved mechanism for damping vibrations in compressor or turbine blades of a gas turbine aircraft engine.

BACKGROUND OF THE INVENTION

The present invention is a mechanism incorporated in each of the blades of one or more rotor stages of a compressor or turbine of a gas turbine engine. The blades of the rotor are circumferentially distributed on a disk for rotation therewith about the disk axis. A conventional rotor blade has a root or dovetail portion which is slidably received in a complementarily configured recess provided in the rotor disk, a platform portion located outside the rotor disk, an airfoil portion extending radially outwardly from the platform and in some cases a segmented shroud located at the tips of the airfoils, each shroud segment being connected to a corresponding blade tip.

The platforms collectively define a radially outwardly facing wall and the tip shroud segments collectively define a radially inwardly facing wall of an annular gas flow passageway through the engine. The airfoils of the rotor blades extend radially into the passageway to interact aerodynamically with the gas flow therethrough.

These airfoils are subject to fatigue due to vibrations even though the angular speeds are low, for example, 4,000 rpm. It is necessary to damp such vibrations to reduce the fatigue on the blades, particularly at or near resonant frequencies.

Various types of blade dampers are known. For example, one type of damper consists of so-called under-platform dampers which generally have a movable member positioned between the rotor disk and the underside of the platform of one or more turbine blades. Upon rotation of the turbine, the member is displaced radially outwardly by centrifugal forces to engage the undersides of adjacent blades and thereby perform a damping function. Dampers of this type are disclosed in U.S. Pat. Nos. 4,568,247, 4,872,810 and 4,917,574.

In yet another type of damper, a member is positioned between the platforms of adjacent blades. In accordance with the teaching of U.S. Pat. No. 2,912,223 to Hull, a spring-like member arranged between the platforms of adjacent blades is used to damp vibrations of the blades and seal the gap between adjacent platforms. U.S. Pat. No. 4,497,611 to Keller teaches an axial flow turbine wherein a wedge-shaped member is axially displaced by an axial pressure difference, whereby turbine blade vibration is damped.

In accordance with the teaching of U.S. Pat. No. 4,872,812 to Hendley et al., vibration damping and gap sealing are provided by elongated inserts of equilateral triangular cross section loosely received within pockets at the spacing gaps between opposing convex and concave airfoil side edges of adjacent blade platforms. The inserts and pockets are relatively configured to provide self-orientation of the inserts into gap sealing and vibration damping engagement with the platform edges when acted upon by centrifugal forces due to rotor rotation.

An improved vibration damper for a turbine rotor blade was disclosed in U.S. Pat. No. 4,936,749 to Arrao et al. A U-shaped wire-form damping member has its legs respectively slidably received in a pair of inclined recesses which extend into the platform portion of the blade and toward the root portion. When the rotor disk is rotated at a sufficiently great angular speed, the damping members move outwardly due to the centrifugal force acting thereon to engage the opposing surface of the adjacent blade platform. When so engaged, the members damp vibrations of such blades and seal the space between the opposing platform surfaces.

Another vibration damper for rotor blades of a gas turbine engine is disclosed in co-pending U.S. patent application Ser. No. 07/830,143 to Steckle et al., entitled "Turbine Blade Platform Damper", now U.S. Pat. No. 5,302,085, which application is commonly assigned to the assignee of the present application. That improved vibration damper comprises a cylindrical shaft and a disk-like contact head connected thereto. The shaft is slidably inserted in a cylindrical recess incorporated in the rotor blade platform. During rotation of the rotor disk, the shaft of the damping member slides along the shaft axis, whereby the damping member is moved radially outwardly and circumferentially by centrifugal forces. The contact head of the damping member of one rotor blade bears against the platform portion of an adjacent rotor blade, serving to damp vibratory motion of both blades.

SUMMARY OF THE INVENTION

An object of the present invention is to improve upon the prior art mechanisms for damping vibration in a rotor. In particular, it is an object of the invention to provide a mechanism whose damping effect can be localized to the specific portion of the hardware which is undergoing undesirable vibratory motion.

Another object of the invention is to provide a platform damper that is able to damp radial motion of the platform associated with torsional vibratory modes of slender, high-aspect-ratio low-pressure turbine blades having platforms overhanging the root or dovetail.

It is yet another object of the invention to incorporate a vibration damper having a mass which can selected to provide optimal damping of undesired torsional vibrations in the rotor blade platform.

A further object of the invention is to provide a damping mechanism which is self-retained in the rotor blade, thereby ensuring foolproof assembly, i.e., the dampers cannot be inadvertently left out during assembly. Also it is an object to provide a damper which will not jam between adjacent blade platforms, enabling easy disassembly of the rotor without damage to the walls of the pocket in which the damper is retained.

Yet another object of the invention is to provide a damping mechanism which is hidden in the platform portion of a rotor blade, thereby eliminating windage loss.

Also it is an object of the invention to provide a damping mechanism of simple geometry which can be easily and economically retrofitted into existing hardware. The pocket for the damper can be formed in the platform without compromising the structural integrity of the rotor blade.

A further object of the invention is to provide damping means in addition to the tip shroud damper for damping modes of vibration for which the tip shroud damper is not optimized.

These and other objects are realized in accordance with the invention by providing each rotor blade with a generally wedge-shaped damping member loosely arranged in a corresponding wedge-shaped pocket formed in the root cavity of the blade and having two scrubbing surfaces. During rotation of the low-pressure turbine rotor, the solid damping member is flung radially outwardly by the centrifugal forces acting thereon. One scrubbing surface of the damping member of each rotor blade bears against the skirt of the adjacent platform when the damping member is located at its radially outermost position. The other scrubbing surface rubs against a corresponding surface formed in the platform of the rotor blade in which the damping member is seated. The scrubbing action, i.e., the relative movement between the dampers and the blade platforms, during operation of the engine serves to damp vibratory radial motion of the platforms. The vibratory energy of the blades is dissipated as heat created by friction between the dampers and the blade platforms.

In accordance with a further aspect of the invention, the damping member can be retained inside the pocket by a pin in a manner such that the damper is free to displace in a plane transverse to the rotor axis of rotation in response to centrifugal forces, but remains loosely coupled to the rotor blade.

One advantage of the improved damper arrangement over prior art dampers is that it can be precisely located and its mass can be precisely selected to damp vibratory motion at a specific location where vibration is greatest.

Another advantage of the invention is that it supplies relatively high damping force in a power turbine where rotational speeds are low: typically 4,000 rpm or less.

Yet another advantage is that the angle between the scrubbing surfaces of the generally wedge-shaped damping member can be selected to ensure adequate damping with minimal risk of jamming. In addition, the mass of the damping member can be varied over a wide range without the necessity of modifying the damper wedge angle or the corresponding pocket angle.

A further advantage is that the improved damper of the invention is inexpensive to manufacture and can be easily reworked into existing hardware.

BRIEF DESCRIPTION OF THE DRAWINGS

These and other advantages of the invention will be better understood when the detailed description of the preferred embodiments of the invention is read in conjunction with the drawings, wherein.

DETAILED DESCRIPTION OF THE PREFERRED EMBODIMENTS

Figure 10:
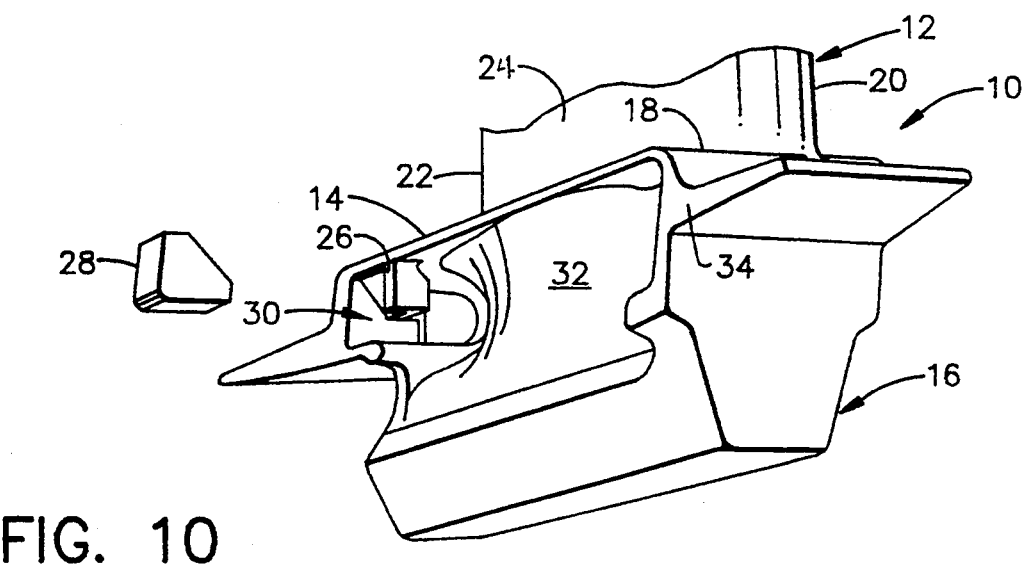
FIG. 10 is a perspective view of the root and platform portions of a rotor blade incorporating a pocket for receiving a damper in accordance with the first preferred embodiment of the invention.

Referring to FIG. 10, it can be seen that each rotor blade 10 has an airfoil portion 12, a platform portion 14 and a root or dovetail portion 16 (the dovetail shown has not been machined to final shape). A plurality of such rotor blades are circumferentially distributed on the periphery of a rotor disk (not shown). The root or dovetail portion 16 of each rotor blade slides into a complementarily configured axially disposed recess in the disk, thereby securing the rotor blade to the disk.

The airfoils extend radially outwardly into an annular flow passageway (not shown) defined between radially outwardly facing cylindrically segmented surfaces 18 of the platforms 14 and a radially inwardly facing surface (not shown) of a tip shroud. The rotor is journalled for rotation about a horizontal axis (not shown) such that the airfoils rotate in the annular flow passageway in response to axial flow of gas from a combustor (not shown) through the passageway. Each airfoil has a rounded leading edge 20 directed toward the gas flow, a trailing edge 22, a convex suction surface 24 and a concave pressure surface (not shown).

The entire rotor blade is preferably an integrally formed cast-and-machined member. The airfoil extends radially outwardly from platform radially outer surface 18 to the tip shrouds (not shown). When exposed to the gas flow, the airfoil is subjected to both flexural and torsional stresses.

In accordance with the first preferred embodiment of the invention, a conventional rotor blade can be retrofitted to incorporate a generally block-shaped insert 26 which is installed into a machined recess and then secured to the blade by braze. A wedge-shaped pocket 30 is then machined into a portion of the blade and a portion of the insert 26 for receiving a generally wedge-shaped damping member 28 shown in FIG. 10. Alternatively, the wedge-shaped pocket 30 could be cast into a new blade or, for even greater precision, the pocket 30 could be cast and then machined into a new blade. The former method of manufacture will now be described with reference to FIG. 1.

Figure 1:
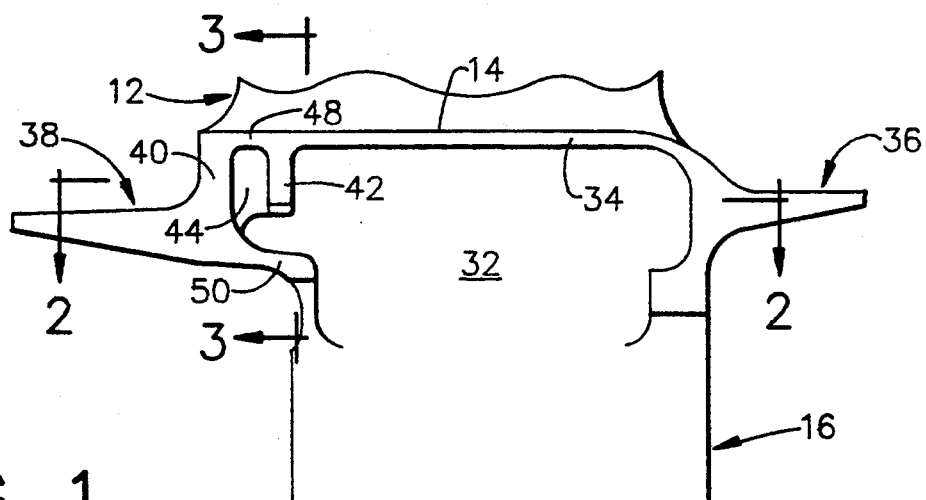
FIG. 1 is a side elevational view showing the root and platform portions of a rotor blade in an as-cast condition prior to final machining to incorporate a pocket for receiving a damper in accordance with the first preferred embodiment of the invention.

Referring to FIG. 1, the platform 14 of the improved rotor blade is generally a solid body having a recess 32 and a leading side surface 34 on the suction side, a forward extension 36 and a rearward extension 38. A recess and lagging side surface on the pressure side are not visible in FIG. 1. The forward and rearward extensions 36 and 38 are generally slightly rounded segmented members having a surface of revolution generated about the axis of the rotor disk.

During rotation of the rotor, torsional vibrations occur in the airfoil need to be damped by a suitable damping device. In accordance with the invention, a damping device is incorporated in the platform portion of each rotor blade at a position such that it damps torsional vibration during rotation. This torsional vibration causes radial motion of the rear edge of the platform on the pressure side.

Figure 2:
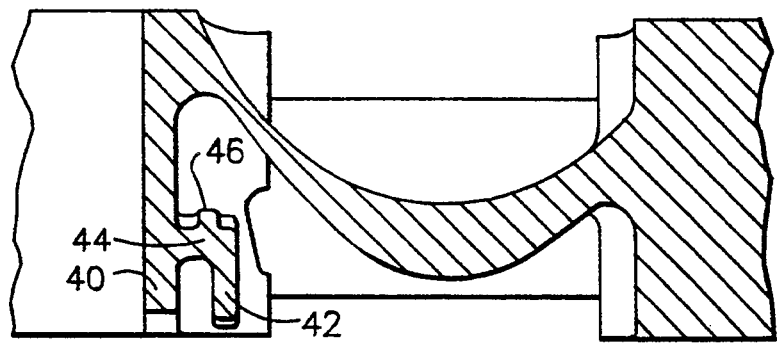
FIGS. 2 and 3 are sectional views respectively taken along lines 2—2 and 3—3 indicated in FIG. 1.
Figure 3:
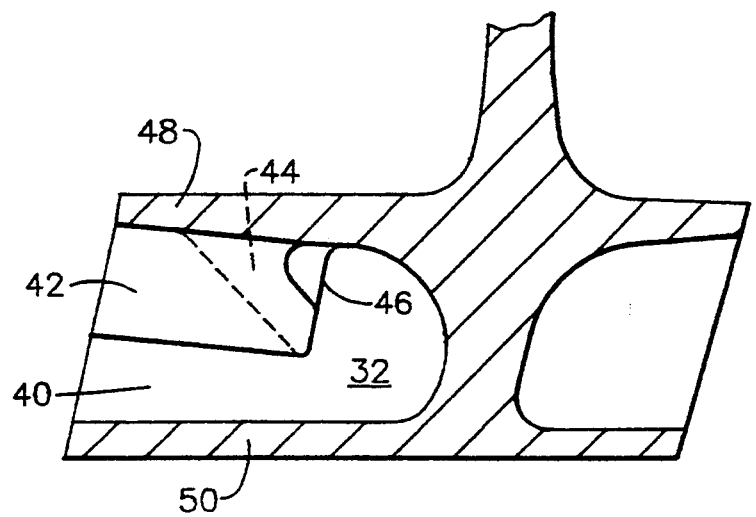

In accordance with the method of manufacturing the first embodiment, the as-cast rotor blade shown in FIGS. 1 through 3 has an unmachined pocket defined by the aft wall 40 of the platform 14, an inclined wall 44 integrally connected to aft wall 40 and top wall 48 of the platform, and a side wall 42 integrally connected to inclined wall 44 and top wall 48. A rib or gusset 46 is provided between inclined wall 44 and top wall 48 to provide structural rigidity. The side wall 42 generally lies in a plane transverse to the axis of rotation. The bottom of side wall 42 is not connected to the bottom wall 50 of platform 14 so as to yield a lighter-weight design and to retain root flexibility.

Figure 4:
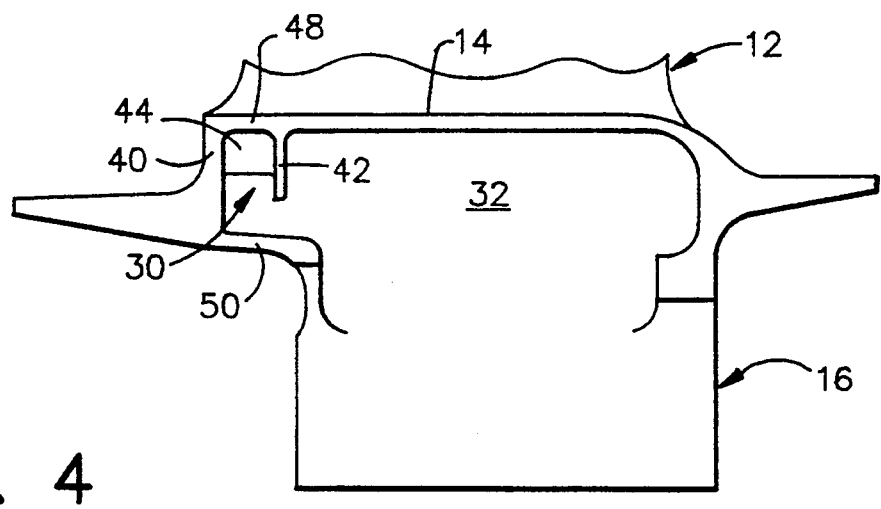
FIG. 4 is a side elevational view showing the root and platform portions of the rotor blade of FIG. 1 after machining.

The as-cast rotor blade depicted in FIGS. 1-3 is subsequently machined using plunge electrode discharge machining (EDM) to form pocket 30 to precise specifications as shown in FIG. 4. After EDM, each of the pocket-defining surfaces of walls 40, 42 and 44 substantially planar. The opposing machined surfaces of walls 40 and 42 are substantially mutually parallel. The machined surface of inclined wall 44 is substantially perpendicular to the machined surfaces of walls 40 and 42. The angle of inclination of the machined surface of inclined wall 44 relative to the radial axis of the rotor blade will depend on the vertex angle between the scrubbing surfaces of the wedge-shaped damper 28, which in the preferred embodiment is 55 degrees.

Figure 5:
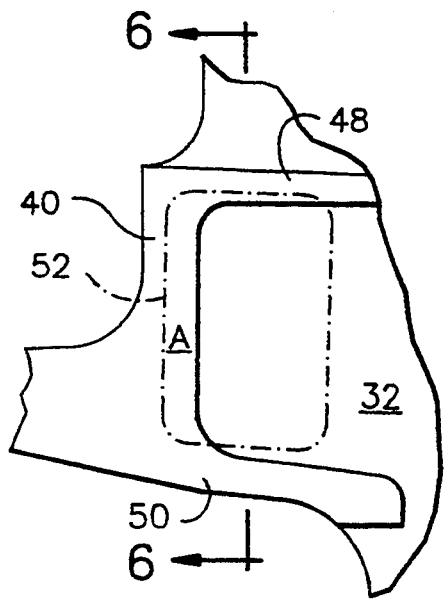
FIG. 5 is a side view illustrating the first step in the process of retrofitting a conventional rotor blade to incorporate a damper in accordance with the first preferred embodiment of the invention.
Figure 6:
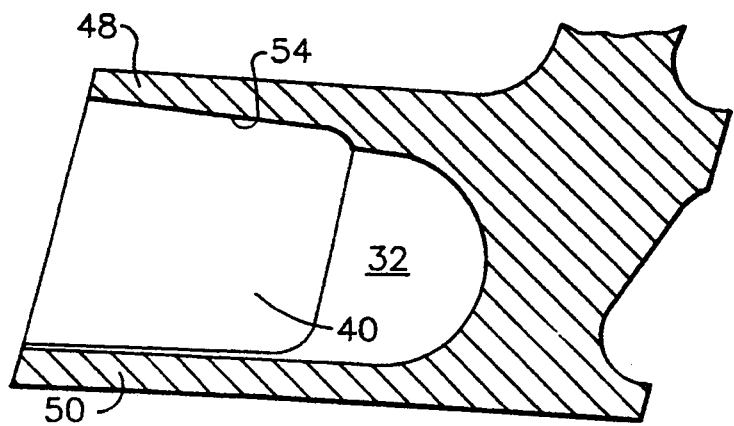
FIG. 6 is a sectional view taken along the line 6—6 in FIG. 5.

In accordance with the method of manufacture shown in FIGS. 5 through 9, a conventional rotor blade is retrofitted with the invention. The first step in the retrofitting in accordance with the invention is shown in FIGS. 5 and 6. FIG. 5 shows a portion of the boundary of recess 32 before the first EDM recess is formed. During EDM, an electrode is plunged into the platform to machine the aft and top walls thereof. The outline of a cross section of this electrode is denoted by dot-dash line 52, which generally defines a rectangle with rounded corners. This electrode forms recesses in aft wall 40 and top wall 48 having the same configuration as the portions of the electrode contacting those walls. The area A indicates the material removed during this first EDM step. The resulting L-shaped recess formed in aft and top walls 40 and 48 is designated by numeral 54 in FIG. 6.

Figure 7:
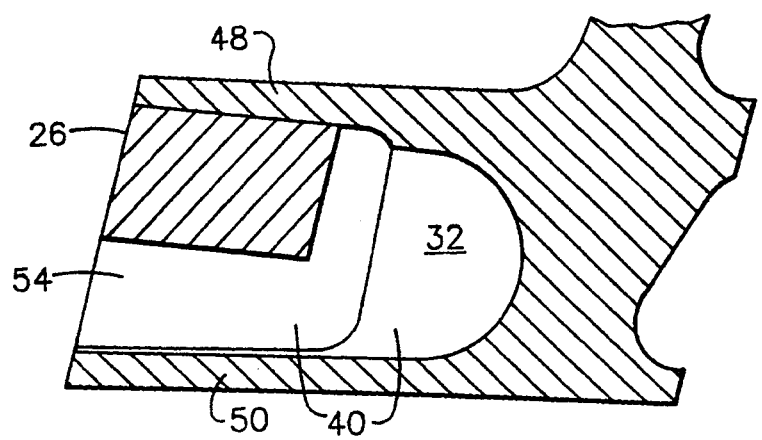
FIGS. 7 and 8 are sectional views like FIG. 6, but illustrating the second and third steps in the process of retrofitting a rotor blade to incorporate a damper in accordance with the first preferred embodiment of the invention.

The next step in the retrofitting is to insert a metal block 26 into recess 54 as depicted in FIG. 7. Block 26 is joined to the platform by brazing, i.e., a side surface of block 26 is brazed to the machined surface of aft wall 40 and a top surface of block 26 is brazed to the machined surface of top wall 48.

Figure 8:
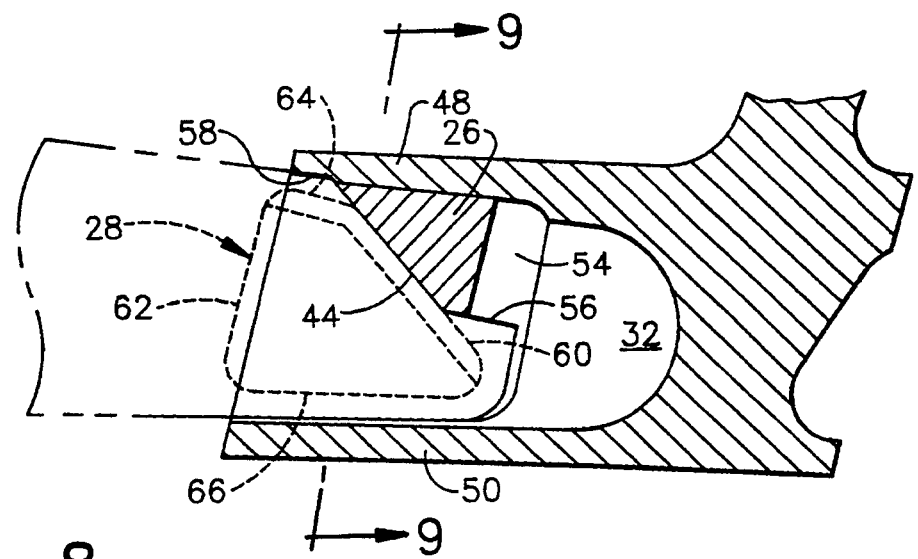

In the next retrofitting step shown in FIG. 8, another electrode 56 (denoted in part by dashed lines), different in shape from the first electrode 52, is plunged into block 26 to remove sufficient metal to form an inclined wall 44 in block 26. The width of the inclined wall is less than the full width of the block, i.e., a predetermined thickness of metal in the forward portion of the block is not removed by EDM, thereby forming side wall 42 (see FIG. 9). Also, the electrode removes additional material from the top wall 48, forming surface 58 thereon.

After inclined wall 44 has been formed, the rotor blade is ready for assembly. Each rotor blade is mounted on the rotor disk with a wedge-shaped damper 28 (see FIG. 10) inserted in the pocket 30.

Figure 9:
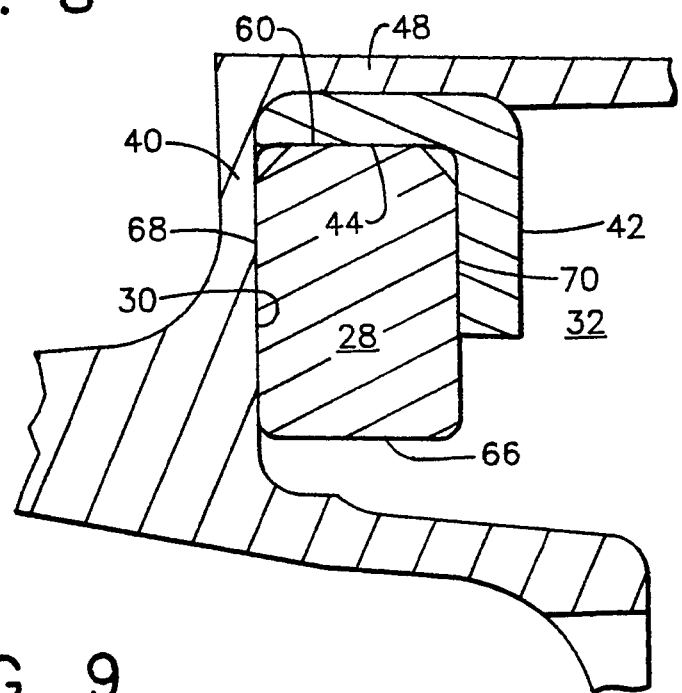
FIG. 9 is a sectional view taken along line 9—9 in FIG. 8.

The preferred embodiment of the damper is depicted in the assembled state and during operation in FIGS. 8 and 9. Damper 28 is generally wedge shaped. More particularly, damper 28 is a flat plate having a substantially convex quadrilateral cross section, as indicated by dashed lines in FIG. 8. Thus, the inventors intend to include a truncated wedge shape within the definition of the term "generally wedge-shaped". The four surfaces of the preferred embodiment of the damper are labeled 60, 62, 64 and 66 in FIG. 8. Surfaces 60 and 62 are scrubbing surfaces. The side edges of surfaces 60 and 64 of the damping member 28 are chamfered or radiused. The damper is preferably made of L605 cobalt-based alloy.

As seen in FIGS. 8 and 9, when the rotor disk rotates, the damping member 28 is subjected to centrifugal forces which cause the damping member to slidably displace. Side walls 68 and 70 of the damping member 28 are constrained from displacement in the axial direction by the opposing machined surfaces of aft wall 40 and side wall 42 respectively. Thus, damper displacement is confined to a plane substantially transverse to the axis of rotation. Although in the preferred embodiment, the surfaces of walls 40, 42, 68 and 70 are all planar, it will be appreciated that only one of each pair of opposing surfaces need be planar since the other surface need only have a plurality of contact points which lie in a plane.

The damping member 28 slides radially outwardly and circumferentially until the scrubbing surface 62 abuts the platform of the adjacent rotor blade (not shown). The damping member 28 adjusts automatically under centrifugal loading to bear against the adjacent blade platform despite variations in the width of the gap between platforms.

During vibration of the rotor blades, scrubbing surface 60 rubs against the surface of inclined wall 44 and scrubbing surface 62 rubs against a side surface of the platform of the adjacent rotor blade. The friction of this scrubbing action dissipates energy, thereby damping the vibrations. The blade-to-blade friction scrubbing action due to this forced engagement damps vibratory motion in the radial and axial directions of the platforms of both rotor blades. Each pair of adjacent rotor blades are similarly coupled.

To prevent jamming of the damping member between adjacent platforms while achieving optimum damping, the angle between the scrubbing surfaces on the damping member is critical. Tests performed by the inventors indicate the damper is effective for vertex angles beginning with 75 degrees and becoming more effective for smaller angles to 45 degrees. A preferred angle of 55 degrees was selected as the smallest angle achievable without jamming.

The damping effect can be increased by adding mass to the damping member. Although a wedge-shaped damping member of substantially triangular cross section could be employed as an alternative embodiment (see FIG. 11), the damping effect can be increased by adding depth to the damping member, i.e., by making a damping member of substantially quadrilateral cross section. This added mass increases the forces normal to the scrubbing surfaces of the damping member, thereby increasing the force of friction and correspondingly the amount of energy dissipated by friction during rubbing of the scrubbing surfaces. It should be noted, however, that surface 64 (see FIG. 8) of the damping member 28 does not rub against machined surface 58 of top wall 48.

Figure 11:
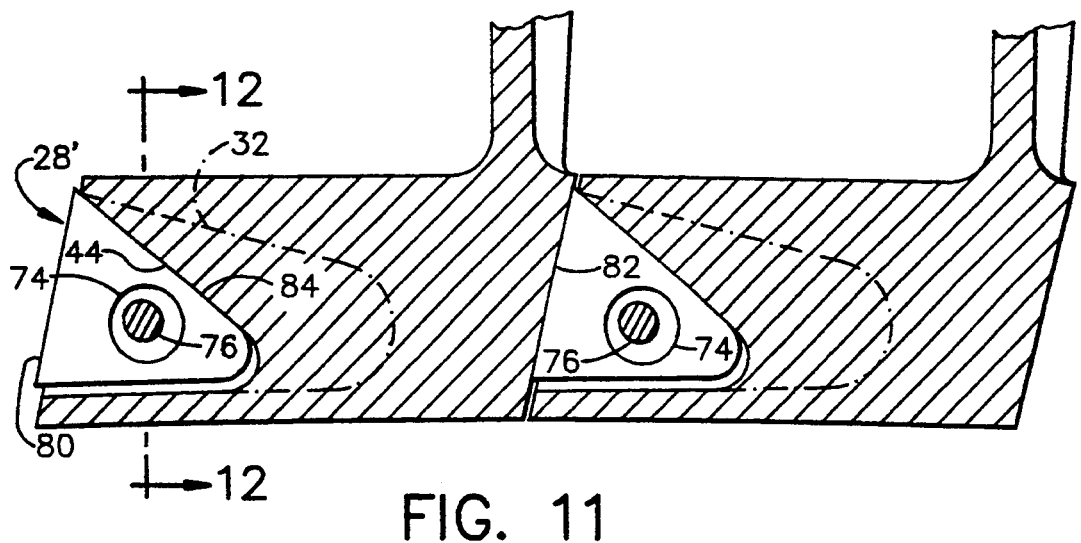
FIG. 11 is a partially sectioned side view of a portion of the platform incorporating a pocket for receiving a damper in accordance with a second preferred embodiment of the invention.
Figure 12:
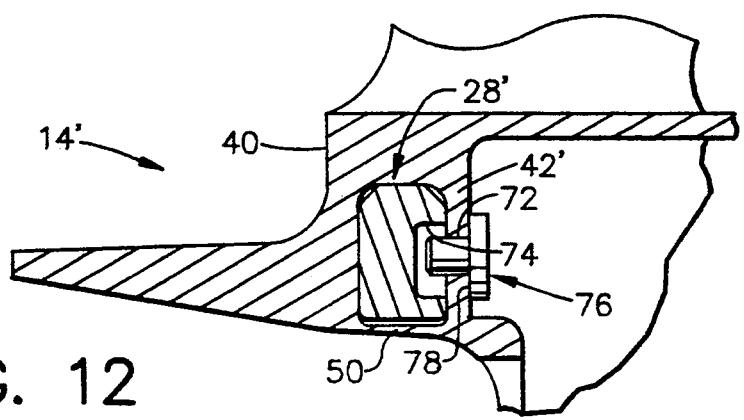
FIG. 12 is a sectional view taken along line 12—12 in FIG. 11.

A damping member 28' of substantially triangular cross section is incorporated in the alternative preferred embodiment shown in FIGS. 11 and 12. This alternative embodiment also includes means for loosely retaining the damping member inside the pocket to ensure foolproof assembly. In accordance with this alternative embodiment, side wall 42' is connected to the bottom wall 50 of the platform 14'. A throughhole 72 of circular cross section is bored in side wall 42' and a recess 74 of circular cross section is bored in damping member 28'.

A retainer pin 76 is securely mounted in throughhole 72 by brazing 78. Pin 76 has a shaft which extends into recess 74 of the damping member, thereby preventing the damping member from being removed from the pocket. The diameter of recess 74 is greater than the diameter of the shaft of pin 76, so that damping member 28' can slidably displace radially and circumferentially inside the pocket over a circular area of predetermined radius. The diameter of the recess 74 and the shaft of pin 76 are selected so that scrubbing surface 80 will abut the skirt 82 of the adjacent platform and scrubbing surface 84 will abut inclined wall 44 during slidable displacement in response to centrifugal forces.

Alternatively, the damping member of the invention can be retained in the pocket by a clip. Such a retaining clip is described in co-pending U.S. patent application Ser. No. 07/830,146, to Philip W. Dietz, et al. entitled "Retention Device for Turbine Blade Damper", which application is commonly assigned to the assignee of the present application. The specification and drawings of that co-pending application are specifically incorporated by reference herein.

The preferred embodiments have been described in detail hereinabove for the purpose of illustration only. It will be apparent to a practitioner of ordinary skill in the art of gas turbine engines that various modifications could be made to the above-described structures without departing from the spirit and scope of the invention as defined in the claims set forth hereinafter.

For example, the damping device of the present invention could be located at other positions such that it damps undesirable vibratory motion occurring at other portions of the platform. In addition, if desired, the pocket for receiving the damping element could extend into the platform from the lagging side thereof and the damping member could be arranged to move outwardly along the wall of the recess to engage the opposing leading side surface of the adjacent blade.

We claim:

1. A method of retrofitting a rotor blade for a rotor of an engine, said rotor blade comprising a root portion, a platform portion connected to said root portion and having a cavity, and an airfoil portion connected to said platform portion, comprising the steps of:

forming a generally wedge-shaped damping member having first and second sliding contact surfaces which are disposed parallel to each other and separated by a predetermined distance, and first and second scrubbing surfaces which are disposed at a predetermined angle relative to each other;

machining a top wall of said platform portion to enlarge said cavity;

installing a block inside said cavity by joining said block to at least said machined top wall;

machining said installed block to form first and second mutually parallel orienting surfaces and a scrubbing surface which partly define a pocket in said cavity, said first and second orienting surfaces being separated by a distance slightly greater than said predetermined distance; and inserting said damping member in said pocket so that said first and second sliding contact surfaces respectively abut said first and second orienting surfaces, whereby said damping member is slidably displaceable only in a predetermined plane.

2. The method of retrofitting a rotor blade as defined in claim 1, wherein during said step of machining said top wall of said platform portion, an aft wall of said platform portion is also machined; and during said step of installing said block, said block is also joined to said once-machined aft wall.

3. The method of retrofitting a rotor blade as defined in claim 2, wherein said predetermined plane is substantially perpendicular to said axis of rotation, said scrubbing surface of said installed block is substantially perpendicular to said first and second orienting surfaces; and said first and second scrubbing surfaces of said damping member are substantially perpendicular to said first and second sliding contact surfaces.

4. The method of retrofitting a rotor blade defined in claim 1, wherein said predetermined angle is less than 75 degrees and greater than 45 degrees.

5. The method of retrofitting a rotor blade as defined in claim 1, further comprising the steps of:

forming a bore which extends from said orienting surface through a side wall formed by said machining of said installed block;

forming a recess in said first planar surface of said damping member; and installing a first portion of a retaining pin in said bore such that a second portion of said retaining pin protrudes into said aperture in said damping member when said damping member is inserted in said pocket.

6. The method of retrofitting a rotor blade as defined in claim 5, wherein said recess in said damping member has a cross-sectional area greater than the cross-sectional area of said second portion of said retaining pin, whereby said damping member is loosely retained in said pocket.

* * * * *